United States Patent [19]

Steiner et al.

[11] 4,438,176

[45] Mar. 20, 1984

[54] THERMOPLASTIC COATED FILMS WITH ANTI-STATIC PROPERTIES

[75] Inventors: Robert H. Steiner, Rochester; Robert E. Touhsaent, Fairport, both of N.Y.

[73] Assignee: Mobil Oil Corporation, New York, N.Y.

[21] Appl. No.: 457,533

[22] Filed: Jan. 12, 1983

Related U.S. Application Data

[63] Continuation of Ser. No. 970,719, Dec. 18, 1978, abandoned.

[51] Int. Cl.$^3$ ............................................. B32B 27/00
[52] U.S. Cl. ........................................ 428/349; 428/922; 428/409; 428/411.1; 428/518; 426/415; 260/DIG. 15; 260/DIG. 21
[58] Field of Search .............. 428/411, 518, 409, 922, 428/349; 156/244.23; 568/623, 624, 852; 426/415; 106/331; 427/400; 260/DIG. 15, DIG. 21

[56] References Cited

U.S. PATENT DOCUMENTS

| | | | |
|---|---|---|---|
| 2,702,257 | 2/1955 | Harmon | 260/DIG. 15 |
| 2,772,172 | 11/1956 | Carsan | 426/415 |
| 2,828,237 | 3/1958 | Rosser | 156/331 |
| 3,033,707 | 5/1962 | Lacys et al. | 156/244.23 |
| 3,230,135 | 1/1966 | Hurst | 156/244.23 |
| 3,570,748 | 3/1971 | Coyle et al. | 156/244.23 |
| 3,652,713 | 3/1972 | Okazaki et al. | 268/860 |
| 3,926,551 | 12/1975 | Okada et al. | 427/400 |
| 4,048,428 | 9/1977 | Baird | 428/518 |
| 4,115,334 | 9/1978 | Gerow | 428/518 |

*Primary Examiner*—George F. Lesmes
*Assistant Examiner*—E. Rollins Buffalow
*Attorney, Agent, or Firm*—Alexander J. McKillop; Michael G. Gilman; James P. O'Sullivan, Sr.

[57] ABSTRACT

The present invention relates to thermoplastic films such as polypropylene and more particularly to bi-axially oriented polypropylene which are characterized by having excellent anti-static properties and good resistance to the transmission of oxygen and moisture vapor. These properties are achieved by the application of a thin primer layer containing poly (ethylenimine) to corona discharge treated oriented polypropylene film followed by the application of an aqueous dispersion of a vinylidene chloride multipolymer containing a water soluble polyol such as a low molecular weight glycol or a poly (ethylene oxide) adduct of a nonpolar molecule.

2 Claims, No Drawings

THERMOPLASTIC COATED FILMS WITH ANTI-STATIC PROPERTIES

This is a continuation of copending application Ser. No. 970,719, filed Dec. 18, 1978, now abandoned.

BACKGROUND OF THE INVENTION

1. Field of the Invention

The present invention relates to the employment of multipolymers comprising vinylidene chloride based polymers as coatings for thermoplastic packaging films. Such coatings contain incorporated therein minor amounts of a novel anti-static additive material employed to reduce the tendency of such film materials to accumulate electrostatic charges and thus attract and hold particulate materials. The anti-static characteristics of the coating additionally reduce the film's undesirable tendency to cling or adhere to the surfaces of automatic packaging equipment.

2. Brief Description of the Prior Art

The employment of multipolymers of vinylidene chloride, hereinafter referred to as saran, as coatings for oriented polypropylene materials has been recognized in the prior art as an effective means for increasing the resistance of such film materials to the transmission of gases and vapors, such as oxygen and moisture vapor for example. Additionally, such saran topcoating materials have been known to promote the heat sealability of such oriented film structures which, in an uncoated state, tend to seal only with great difficulty, if at all. Saran coated oriented polypropylene is a particularly good packaging material for products which tend to be sensitive to attack by oxygen such as, for example, coffee and cheese. However, such saran coated plastic materials have a tendency to develop a static charge when used on packaging equipment. This has been an obstacle particularly when packaging ground coffee and other particulate products in that the static charge developed on the film tends to attract the product to the seal area thus preventing the packaging film from effectively sealing to itself in a continuous manner.

In the past such coated packaging film has been produced by subjecting the surface of an oriented film to a corona discharge treatment to pretreat the surface in order to improve its receptivity, i.e., bonding characteristics, to coatings which may be subsequently applied thereto. Other surface pretreatment techniques which may be employed include flame treatment or treatment of the film surface with oxidizing chemicals such as chromic acid for example. The thus treated oriented polypropylene may then be coated with a thin layer of a primer material which serves to enhance the adherence of the saran topcoat layer, subsequently supplied to the base film. Primers which have been used in the past include polyurethane dissolved in organic solvents, see for example U.S. Pat. No. 3,023,125. Alternatively, the saran coating may, in certain instances, be applied directly on the treated film surface without the employment of a special primer coating. A wide variety of saran topcoat materials are currently commercially available. Any one of these sarans may be employed in the practice of the present invention and preferably those which have a vinylidene chloride content of about 75% by weight up to about 92% by weight. Any one of a number of well known coating additives may also be incorporated in the saran topcoat material. Adjuvants such as carnauba wax, employed to promote cold slip and reduce blocking tendencies; additionally materials such as talc employed to improve the frictional characteristics of the film surface, and many other prior art materials may be added to the particular saran latex employed to achieve the desired coating characteristics.

British Pat. No. 974,116 teaches the use of cationic surface active agents as antistatic additives for polymeric coatings for polyolefin films, specifically quaternary ammonium compounds. However, these materials are well known to exhibit high levels of toxicity and their use in packaging films for food products is not acceptable.

Conventional anti-static agents for plastic films such as glycerylmonostearate and high molecular weight secondary or tertiary amines, e.g., U.S. Pat. No. 3,663,488, have been found to be impractical for use in coated films. In the first place, they are difficult to disperse uniformly in aqueous latex coatings and secondarily, they destroy the essential heat seal properties of the resultant films. In contrast the coated films prepared in accordance with the present invention exhibit excellent heat seal properties.

Water soluble non-ionic surface active agents such as nonylphenoxy poly(ethylene oxide) have been claimed to be effective anti-stats when admixed with a saran topcoat on a modified polypropylene base sheet but these destroy heat sealability when applied to a 100% polypropylene base sheet. Note Japanese Pat. Nos. 49-38021 and 52-50232.

SUMMARY OF THE INVENTION

In the coating compositions of the present invention, it has been found that the use of a primer coating containing poly(ethylene imine), hereafter referred to as PEI, together with a topcoating of a saran latex in which has been incorporated small amounts of specific water soluble non-ionic polyhydroxy organic compounds produces unexpected improvements in the resultant coated film structure.

The use of PEI as a primer or adhesive for polymeric coatings to film substrates such as cellophane or polyolefins is well known to the art, as disclosed in British Pat. Nos. 766,827 and 910,875 and U.S. Pat. No. 3,230,135 for example. Other adhesive materials such as epoxy resins may be used in conjunction with the PEI in the primer layer, but it is an essential feature of this invention that PEI be present in the subcoat. The amount of PEI deposited on the film is difficult to measure directly as it is so minute. It is estimated that the concentration on the film surface is in the range of 0.0005 to 0.005 grams per 1000 $in^2$ of film surface.

It has been found that PEI being present even in this small amount in an intermediate layer between the substrate oriented polypropylene film and a topcoating comprising a poly(vinylidene chloride) multipolymer will confer a moderate degree of anti-static activity to the resultant film. We have now further found that the addition of a water soluble low molecular weight polyol or a non-ionic wetting agent comprising a poly(ethylene oxide) adduct of a non-polar molecular to the latex composition before application to the film substrate greatly enhances the ability of the film to dissipate accumulated electrostatic charges at rapid rates. The amount of water soluble polyol material required to achieve good anti-static properties may range from about 0.1 to about 10% of the polymer content of the coating latex. More specifically, a range of about 0.5 to about 5%. The preferred range is from about 1.0% to about 4%.

The exact mechanism for the achievement of high levels of anti-static activities for the non-ionic anti-static additives employed in the coating compositions of the present invention is not completely understood. It may be theorized, however, that such increased anti-static activity may result from the fact that the particular materials employed in the present invention may act as humectants, i.e., materials which can retain and hold liquids such as water.

The water soluble polyols which are effective in this application may be divided into four broad categories, namely;

(a) low molecular weight glycols such as ethylene glycol, 1,2-propylene glycol, 1,3-propylene glycol, 1,4-butane diol, and the like.

(b) low molecular weight polymerized glycols containing up to about 8 ethylene oxide units such as di(ethylene glycol), tri(ethylene glycol), tetra(ethylene glycol), di(propylene glycol) and the like.

(c) triols and higher polyols such as glycerol, tetrahydroxy butane, pentaerythrital, and the like.

(d) poly(ethylene oxide) adducts of the general formula $$RO(CH_2CH_2O)xH$$

where x = 8–30 and R = a non polar radical such as nonyl phenyl, sorbitan stearate and the like.

As noted above, the specific composition of the vinylidene chloride multipolymer latex which is employed as a topcoating material is not critical to the practice of the present invention. Commercially available saran latexes having a vinylidene chloride content of at least 50% and preferably from about 75% to about 95% may be employed. The other ethylenically unsaturated comonomers employed in the multipolymer saran topcoat may include alpha-beta ethylenically unsaturated acids such as acrylic and methacrylic acids; alkyl esters containing 1-18 carbon atoms of said acids such as methyl methacrylate, ethyl acrylate, butyl acrylate, etc.; alpha-beta ethylenically unsaturated nitriles such as acrylonitrile, methacrylonitrile; monovinyl aromatic compounds such as styrene; and vinyl chloride and others.

The amount of vinylidene chloride coating applied to the substrate film may be varied over a wide range depending upon the specific properties desired in the final film product. Coating weights of from about 1 up to about 6 grams per 1000 square inches may be used. If a two-side coated film is desired the treating/priming/topcoating process can be repeated either inline or out of line.

DESCRIPTION OF SPECIFIC EMBODIMENTS

The anti-static activity of the coated film structures produced in accordance with the following examples was measured on a device in which a film sample is mounted on an electrically shielded cabinet in which the environmental conditions of temperature and relative humidity are closely controlled. An electrical charge is impressed on the film by means of an electrical discharge source. The charge on the film surface is measured by means of an electrometer and recorded continuously on a chart recorder. The initial charge ($E_o$) in kilovolts is measured at the time the external charging is discontinued. Typically, polyolefin films exhibit an $E_o$ value in the range of 4–5 kilovolts. The impressed charge decays asymptotically at a rate indicative of the anti-static activity of the film. The time required for the $E_o$ value to decay by 50% is termed the static half-life (T ½) of the film. Measurement of the electro static charge is continued for three minutes, at which time a final value ($E_3'$) is recorded. Generally, film with poor anti-static properties still exhibit a substantial $E_3'$ value, typically greater than 50% of $E_o$. The half-lives of such films are reported at ">three minutes" and generally these films would be unsatisfactory in packaging machine operations. Films exhibiting T ½ values in the range of about 0.5 to about 1.0 minutes at a relative humidity of about 60% at 25° C., are considered to be fair and may be usable under certain circumstances. Films produced according to the teaching of this invention exhibit T ½ values of less than 0.5 minute and are considered to be excellent.

In the following examples, 1–19 inclusive, specific embodiments of the teachings of the present invention are illustrated. In all cases, biaxially oriented polypropylene film with an average thickness of 0.75 mils (18 microns) was used. It was treated by the conventional corona discharge technique to produce a surface with a wetting tension of about 42 dynes/cm.

In Examples 1 and 2, no primer was used, the compounded latex being applied directly to the corona treated film. In the first case, no anti-static additive was included; in the second, 2.5% of propylene glycol based on vinylidene chloride polymer was added. As can be seen from the data in Table 1, both films showed very little decay of static charge over the three minute duration of the test. In Examples 3 and 4, a standard solvent based urethane primer was used, with and without propylene glycol. Again, both films showed very little anti-static activity.

In Example 5, a dilute aqueous solution of PEI was used as a primer. The amount deposited on the film was too small to be measured by conventional analytical methods, but was estimated to be in the range of 0.001 grams per 1000 in² of film surface. Note that the time required for the initial static charge to decay by one half is reduced to about 0.6 minute from the times of more than three minutes shown by the films of Examples 1–4.

Example 6, was a duplicate of Example 5 except that 2.5 phr of propylene glycol was added to the topcoat. Note the drastic reduction in static half-life to 0.1 minute.

Examples 7–19 show the effect of other water soluble polyols and non-ionic surfactants in reducing the static half-lives.

The vinylidene chloride multipolymer latex used in Examples 7–19 is a typical broad heat sealing range saran which exhibits good resistance to the transmission of gaseous oxygen and is heat sealable at low temperature.

EXAMPLE 1

A biaxially oriented polypropylene film with an average thickness of about 0.75 mils was corona discharge treated in accordance with commonly employed prior art techniques to produce a surface with a wetting tension of about 42 dynes/cm. A saran topcoating was formulated as follows: a latex containing about 54% by weight of a multipolymer comprising about 92% vinylidene chloride, 5% acrylonitrile and 3% methyl acrylate was adjusted to a pH of 8 with ammonia and blended with an aqueous dispersion of finely divided carnauba wax (3 weight percent wax on polymer solids). This saran polymer is a high barrier polymer, exhibiting excellent resistance to the transmission of gaseous oxygen. This mixture was diluted to 40% solids and applied continuously to the treated base film by a gravure roll. The coating was dried continuously in an air oven at 240° F. with a dwell time of 8.6 seconds. The essentially dry coated film (coating weight of 2 g/1000 in$^2$) was wound into a roll and tested for anti-static propensity, which, as shown in Table 1, was very poor.

EXAMPLE 2

The procedure of Example 1 was repeated, except that 2.0% of propylene glycol, based on the saran multipolymer solids, was added to the coating mixture. Again, as shown in Table 1, very poor static properties were observed.

EXAMPLE 3

Oriented polypropylene film, treated as in Example 1, was primed with an 8% by weight solids solution of a commercially available polyurethane adhesive (Morton 76FE62 from Morton Chemical Co.) in methyl ethyl ketone using a gravure roll technique. The dried primed film was topcoated with the saran formulation described in Example 1. Again, very poor static properties were exhibited.

EXAMPLE 4

Film, primed as in Example 3, was topcoated with the saran formulation of Example 2. Very poor static properties were observed.

EXAMPLE 5

Treated film was precoated with a solution of 0.1 weight percent PEI (Polymin M, a product of BASF-Wyandotte Corp.) in water using a 200 mesh quadrigravure roll. The film was dried in an air oven at 210° F. with a residence time of six seconds. The coating weight was too low to be measured, but was calculated to be in the range of 0.001 grams/1000 in$^2$. The saran topcoat of Example 1 was applied to this primed film and was found to have a half-life of less than one minute.

EXAMPLE 6

The primed film of Example 5 was combined with the topcoat of Example 2. The half-life was reduced to about 0.1 minute and represents an excellent film for commercial packaging applications.

EXAMPLE 7

A saran latex containing about 46% by weight of a multipolymer comprising about 80% vinylidene chloride, 5% acrylic acid, and 15% ethyl acrylate was adjusted to a pH of 4 with ammonium hydroxide. It was blended with an acid-stable dispersion of carnauba wax (6% wax solids based on polymer solids) and 0.5% by weight of finely divided talc. About 2.5% by weight, based on the polymer solids, a propylene glycol was then added. This compounded latex was applied to PEI primed oriented polypropylene film by the technique described in Example 1. The excellent T ½ value indicates the usefulness of polyol additives with sealable saran polymers as well as high barrier polymers exemplified in Examples 1–6.

EXAMPLES 8 THROUGH 19

The procedure of Example 7 was followed except that other polyols, as identified in Table 1, were employed.

TABLE 1

| Example | Primer | Saran Type | Polyol Additive | E* | Static Properties T ½ (minutes) | E$_3$· |
|---|---|---|---|---|---|---|
| 1 | none | HB* | none | 4.5 | >3 | 4.3 |
| 2 | none | HB | 2% PG | 4.3 | >3 | 2.8 |
| 3 | urethane | HB | none | 4.4 | >3 | 4.3 |
| 4 | urethane | HB | 2% PG | 4.4 | >3 | 4.0 |
| 5 | PEI | HB | none | 4.85 | 0.6 | 1.15 |
| 6 | PEI | HB | 2% PG | 2.55 | 0.1 | 0.05 |
| 7 | PEI | S | 2% PG | 3.32 | 0.1 | 0.12 |
| -8 | PEI | S | 1% PG | 4.15 | 0.5 | 1.0 |
| -9 | PEI | S | 4% PG | 2.63 | 0.1 | 0.10 |
| -10 | PEI | S | 2.5% EG | 3.4 | 0.1 | 0.05 |
| -11 | PEI | S | 2.5% DEG | 4.65 | 0.5 | 0.85 |
| -12 | PEI | S | 2.5% TrEG | 1.9 | 0.1 | 0.1 |
| -13 | PEI | S | 2.5% TeEG | 2.45 | 0.1 | 0.5 |
| -14 | PEI | S | 2.5% PEG-400 | 4.8 | 0.3 | 0.55 |
| -15 | PEI | S | 2.5% PEG-600 | 5.45 | 0.6 | 1.20 |
| -16 | PEI | S | 2.5% Glycerol | 4.2 | 0.4 | 0.7 |
| -17 | PEI | S | 2.5% BDO | 3.75 | 0.1 | 0.10 |
| -18 | PEI | S | 2.5% CO-630 | 4.80 | 0.1 | 0.25 |
| -19 | PEI | S | 2.5% TW 60 | 4.85 | 0.4 | 0.65 |

*For key to abbreviations employed in Table 1 see following Abbreviation Table.

ABBREVIATION TABLE

HB = high barrier
S = sealable
EG = ethylene glycol
PG = 1,2-propylene glycol
DEG = di(ethylene glycol)
TrEG = tri(ethylene glycol)
TeEG = tetra(ethylene glycol)
PEG400 = poly(ethylene glycol), molecular weight = 400
PEG600 = poly(ethylene glycol), molecular weight = 600
BDO = 1,4-butane diol
CO-630 = Igepal Co-630, $C_4H_9\text{-}C_6H_5O(CH_2CH_2O)_{12}H$
Tw-60 = Tween 60, Sorbitan stearate-$(CH_2CH_2O)_{20}H$ It will be understood that although the saran materials employed in the preceding examples have been characterized as being either "high barrier" or "heat sealable", all of the saran materials employed exhibit both barrier and heat sealable characteristics. However, as employed in the prior art these terms indicate that some saran materials exhibit higher barrier characteristics than others and some saran materials exhibit better heat sealable characteristics than others.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A multi-layer thermoplastic film of improved anti-static characteristics consisting essentially of a film substrate consisting essentially of polypropylene having coated on at least one surface thereof a primer coating consisting essentially of poly(ethylene-imine), said primer coating having a topcoating thereon comprising a vinylidene chloride polymer in admixture with an anti-static proportion of a low molecular weight glycol, said vinylidene chloride top coating retaining its inherent heat seal characteristics.

2. The film of claim 1 wherein said low molecular weight glycol is propylene glycol.

* * * * *